United States Patent
Coldwell

(10) Patent No.: US 10,054,189 B2
(45) Date of Patent: Aug. 21, 2018

(54) POWERTRAIN MOUNT ASSEMBLY FOR A MOTOR VEHICLE

(71) Applicant: Ford Global Technologies, LLC, Dearborn, MI (US)

(72) Inventor: Mel Coldwell, Maldon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/291,901

(22) Filed: Oct. 12, 2016

(65) Prior Publication Data

US 2017/0122401 A1    May 4, 2017

(30) Foreign Application Priority Data

Oct. 28, 2015 (GB) .................................. 1519060.6

(51) Int. Cl.
| | |
|---|---|
| *B60K 5/12* | (2006.01) |
| *F16F 15/08* | (2006.01) |
| *F16F 3/087* | (2006.01) |
| *B62D 63/04* | (2006.01) |

(52) U.S. Cl.
CPC ............ *F16F 15/08* (2013.01); *B60K 5/1208* (2013.01); *B60K 5/1283* (2013.01); *B62D 63/04* (2013.01); *F16F 3/0873* (2013.01)

(58) Field of Classification Search
CPC ........ F16F 3/0873; F16F 15/002; F16F 15/08; B60K 5/1208; B60K 5/1283
See application file for complete search history.

(56) References Cited

U.S. PATENT DOCUMENTS

| 2,705,118 | A | * | 3/1955 | Beck | ....................... | F16F 13/08 |
| | | | | | | 105/131 |
| 3,547,466 | A | * | 12/1970 | Millican | ................ | B60G 11/14 |
| | | | | | | 267/34 |
| 3,903,738 | A | * | 9/1975 | Malchow | ................ | B60K 5/12 |
| | | | | | | 73/114.15 |
| 3,958,654 | A | * | 5/1976 | LeSalver | ................ | B60G 15/00 |
| | | | | | | 180/291 |

(Continued)

FOREIGN PATENT DOCUMENTS

JP    2011144879 A    7/2011

OTHER PUBLICATIONS

Examination Report of Great Britain Patent Application No. 1519060.6, dated Apr. 14, 2016, United Kingdom Intellectual Property Office, 10 pages.

*Primary Examiner* — Frank Bennett Vanaman
(74) *Attorney, Agent, or Firm* — Julia Voutyras; McCoy Russell LLP

(57) ABSTRACT

A powertrain mount includes a resilient mount that is connected to a powertrain component by a connecting arm. The resilient mount is moveable by an actuator member relative to a structural member of a motor vehicle in an opposite direction to a predicted displacement of the connecting arm so as to reduce the displacement of the powertrain component relative to a fixed point on the motor vehicle when the predicted displacement occurs. This reduces the final displacement of the powertrain component relative to a fixed point on the motor vehicle when the predicted displacement occurs and allows the use of a softer resilient mount than would otherwise be the case.

18 Claims, 3 Drawing Sheets

(56) References Cited

U.S. PATENT DOCUMENTS

| | | | |
|---|---|---|---|
| 4,572,321 A * | 2/1986 | Morita | B60K 5/04 |
| | | | 180/297 |
| 4,685,531 A * | 8/1987 | Kopich | B60K 5/1241 |
| | | | 180/300 |
| 5,374,025 A | 12/1994 | Whelpley et al. | |
| 5,520,375 A | 5/1996 | Leibach et al. | |
| 5,529,295 A | 6/1996 | Leibach et al. | |
| 7,198,125 B2 * | 4/2007 | Skelcher | B62D 33/0608 |
| | | | 180/89.13 |
| 2009/0210139 A1 | 8/2009 | Gecim et al. | |
| 2010/0198457 A1 | 8/2010 | Hermann et al. | |
| 2012/0013057 A1 | 1/2012 | Nemoto | |
| 2013/0197740 A1 * | 8/2013 | Hagel | F16F 15/002 |
| | | | 701/32.1 |
| 2013/0328254 A1 | 12/2013 | Kojima et al. | |
| 2014/0249733 A1 | 9/2014 | Ishiguro et al. | |
| 2015/0101901 A1 | 4/2015 | Tokunoh et al. | |

* cited by examiner

POWERTRAIN MOUNT ASSEMBLY FOR A MOTOR VEHICLE

CROSS REFERENCE TO RELATED APPLICATION

The present application claims priority to Great Britain Patent Application No. 1519060.6, filed on Oct. 28, 2015, the entire contents of which are hereby incorporated by reference for all purposes.

FIELD

This disclosure relates to the mounting of a powertrain component such as an engine or transmission of a motor vehicle to a structural part of the motor vehicle to restrain movement of the powertrain component while reducing the transfer of vibrations from the powertrain component to the structural member.

BACKGROUND/SUMMARY

It is desirable to use a powertrain mount that has a large deflection to load characteristic that is to say, a soft mount, in order to maximize the vibration absorption properties of the mount. This is particularly the case when there is substantially no load being transmitted via the powertrain mount such as when an engine is idling and a transmission is in neutral.

However, when the powertrain mount is subject to applied load the use of a soft mount will likely permit an unacceptably high level of displacement of the powertrain component to occur. This is problematic in that it can result in high loads being transferred to associated components such as an exhaust system or require a large clearance to be provided between the engine or transmission and the adjacent parts of the motor vehicle. It will be appreciated that in a modern motor vehicle there is considerable pressure to minimize package space and so the need to provide a large clearance between the engine and/or transmission and adjacent parts of the motor vehicle is undesirable.

Example embodiments of the present application may provide a powertrain mount assembly that permits the use of a relatively soft mount for low load conditions while providing sufficient restraint under load to allow displacement to be minimized.

According to a first aspect of the disclosure there is provided a powertrain mount assembly for connecting a powertrain component to a structural part of a motor vehicle, the assembly comprising a resilient mount for connection to the structural part of the motor vehicle, a connecting arm for connecting the resilient mount to the powertrain component and an actuator to displace the resilient mount relative to the structural part of the motor vehicle and a controller to control the actuator to displace the resilient mount in response to an input indicative of an expected movement of the powertrain component wherein the resilient mount comprises a frame, first and second resilient members mounted in the frame and interposed between the connecting arm and the frame such that movement of the connecting arm in a first primary direction is resisted by compression of the first resilient member and movement of the connecting arm in a second primary direction that is opposite to the first primary direction is resisted by compression of the second resilient member and, when the input indicates that the powertrain component is expected to be displaced relative to the structural part of the motor vehicle, the controller is arranged to use the actuator to displace the frame of the resilient mount in an opposite direction to the expected movement of the powertrain component so as to produce a pre-load in a respective one of the first and second resilient members of the resilient mount.

The displacement of the resilient mount from its nominal position may be arranged to be proportional to the expected load to be transmitted by the resilient mount.

A fixed support member may be provided for fastening to the structural part of the motor vehicle, the frame of the resilient mount may be moveably connected to the fixed support member and, when the powertrain component is expected to be displaced relative to the structural part of the motor vehicle, the actuator may be arranged to displace the frame of the resilient mount relative to the fixed support member in an opposite direction to the expected movement of the powertrain component.

The frame of the resilient mount may be arranged for sliding attachment directly to the structural part of the motor vehicle and, when the powertrain component is expected to be displaced relative to the structural part of the motor vehicle, the actuator may be arranged to displace the frame of the resilient mount relative to the structural part of the motor vehicle in an opposite direction to the expected movement of the powertrain component.

The powertrain component may be one of an engine and a transmission.

The resilient mount may comprise a frame, first and second resilient members mounted in the frame and interposed between the connecting arm and the frame such that movement of the connecting arm in a first primary direction is resisted by compression of the first resilient member and movement of the connecting arm in a second primary direction that is opposite to the first primary direction is resisted by compression of the second resilient member.

The resilient mount may further comprise one or more additional resilient members arranged to resist movement of the connecting arm in one or more direction other than the first and second primary directions.

The resilient members may be formed as a single unitary component.

The first and second primary directions may be directions the powertrain component is expected to be displaced relative to the structural part of the motor vehicle when subject to variations in applied load.

According to a second aspect of the disclosure there is provided a motor vehicle having a body structure, an engine driving a transmission, a powertrain mount constructed in accordance with said first aspect of the disclosure connecting one of the engine and the transmission to a structural member forming part of the body structure of the motor vehicle and the controller controls the actuator to displace the resilient mount in response to the input indicative of the expected movement of one of the engine and the transmission.

The input may be a signal indicative that a state of the transmission is changing from a neutral state to a drive state.

The drive state of the transmission may be a forward drive state.

Alternatively, the drive state of the transmission may be a rear drive state.

The input may be a signal indicative that a torque demand for the engine is to be rapidly increased.

Alternatively, the input may be a signal indicative that a torque demand for the engine is to be rapidly reduced.

BRIEF DESCRIPTION OF THE DRAWINGS

The disclosure will now be described by way of example with reference to the accompanying drawing of which.

DETAILED DESCRIPTION OF THE DRAWINGS

Figure 1:
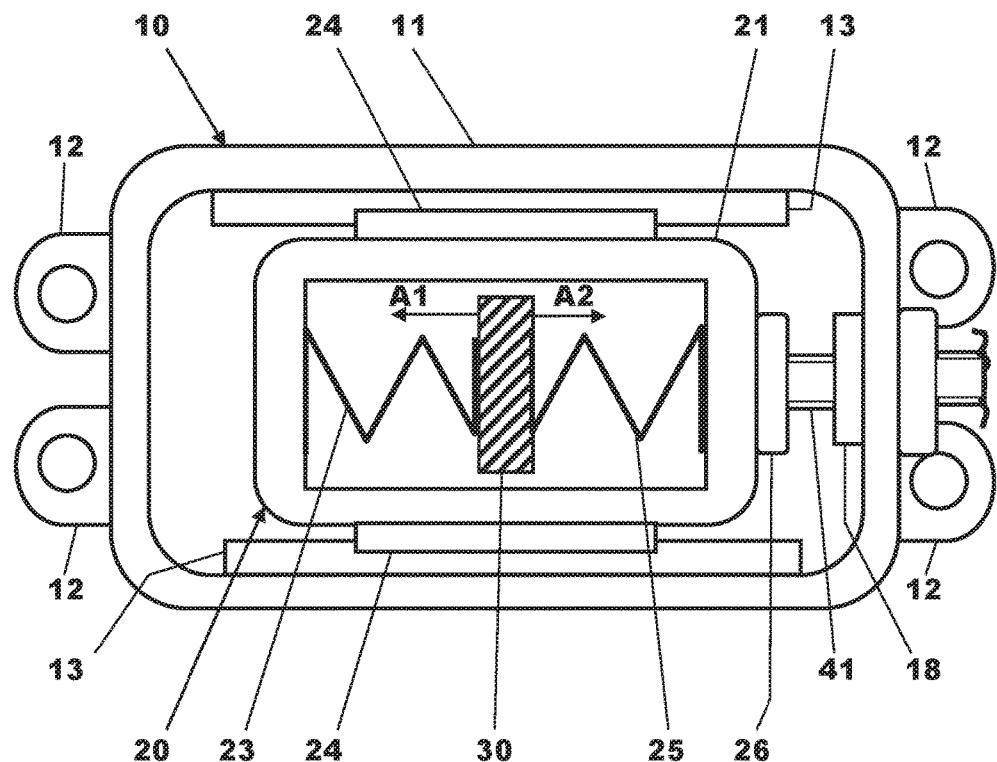
FIG. 1 is a diagrammatic side view of part of a first embodiment of a powertrain mount forming part of a powertrain mount assembly according to a first aspect of the disclosure.
Figure 2:
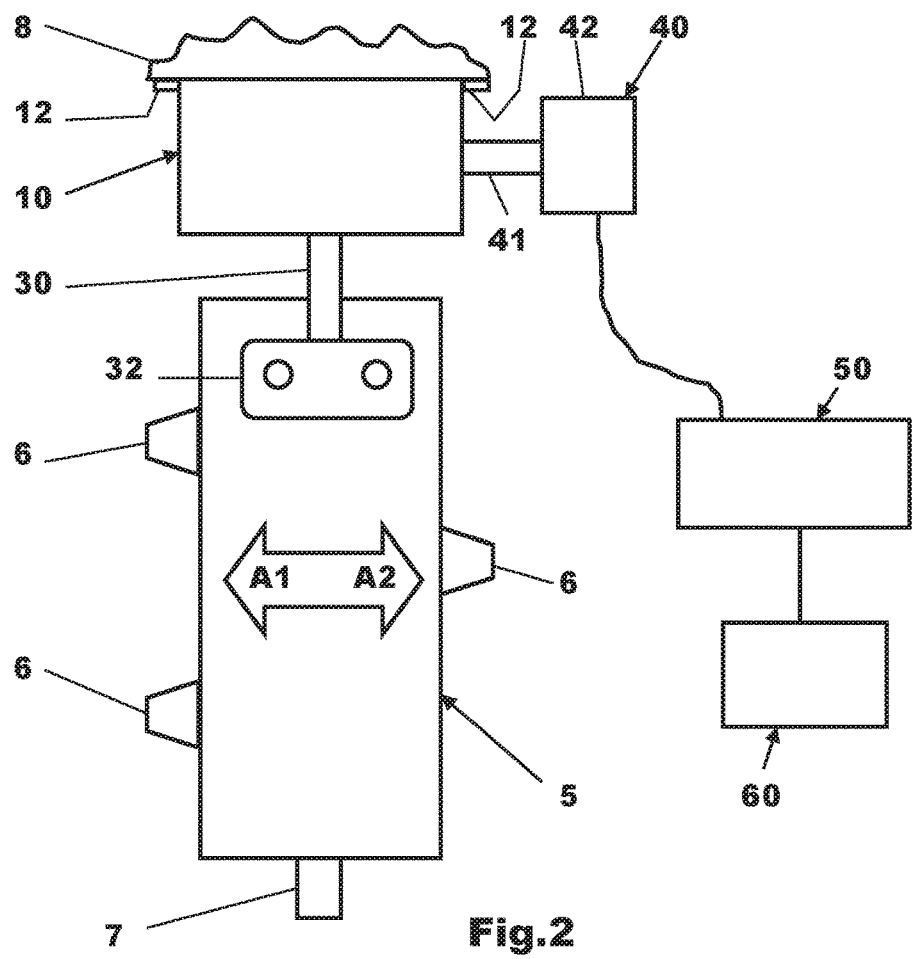
FIG. 2 is a plan view of an engine of a motor vehicle showing a powertrain mount assembly including a powertrain mount as shown in FIG. 1.
Figure 3:
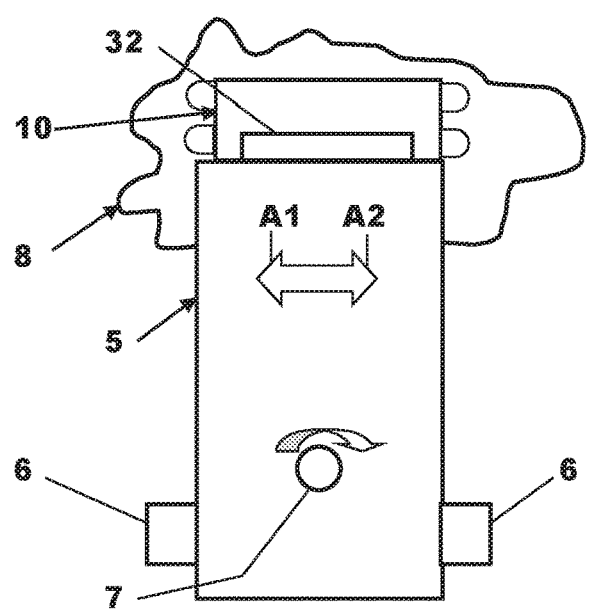
FIG. 3 is a side view of the engine shown in FIG. 2.

With particular reference to FIGS. 1-3 there is shown a powertrain mount 10 comprising a fixed support member 11 having four fastening lugs 12 used to fasten the fixed support member 11 to a structural part 8 of a motor vehicle.

A resilient mount 20 has a frame 21 slidingly mounted in the fixed support member 11 by means of a pair of U-shaped rails 24 that engage with complementary tracks 13 fixed to the inside of the fixed support member 11. It will be appreciated that in practice anti-rattle springs or the like will be provided to prevent rattling of the resilient mount 20 in the fixed support member 11.

The resilient mount 20 is linearly moveable with respect to the fixed support member 11 by means of an actuator assembly 40 comprising a rotary actuator 42 and an actuator shaft 41. The actuator shaft 41 is threadingly engaged with a boss 18 formed as part of the fixed support member 11 and has a free end held captive by a retaining boss 26 formed on the outer surface of the frame 21 of the resilient mount 20. It will be appreciated that the retaining boss 26 is constructed to allow rotary movement of the actuator shaft 41 relative to the frame 21 while coupling the frame 21 and the actuator shaft 41 together.

A connecting arm 30 is used to connect the resilient mount 20 to a fixed mount 32 on the powertrain component it is provided to support which in the case of this example is an internal combustion engine 5. The internal combustion engine 5 is supported at a lower end by in this case two front and one rear resilient mounts 6 and has a crankshaft 7 arranged to drive a transmission (not shown) via a clutch (not shown).

The connecting arm 30 is shown in a nominal position in FIG. 1 and is interposed between first and second resilient members 23 and 25 that are in the form of elastomeric springs. It will be appreciated that in practice further resilient members will be provided to restrain movement of the engine 5 in directions other than the directions restrained by the first and second resilient members 23, 25.

The first and second resilient members 23 and 25 are mounted in the frame 21 and are interposed between the connecting arm 30 and opposite sides of the frame 21 so as to work in opposition to one another. The arrangement is such that movement of the connecting arm 30 in a first primary direction A1 is resisted by compression of the first resilient member 23 and movement of the connecting arm 30 in a second primary direction A2 that is opposite to the first primary direction A1 is resisted by compression of the second resilient member 25.

The first and second primary directions A1 and A2 are directions that the powertrain component in the form of the engine 5 is expected to be displaced relative to the structural part 8 of the motor vehicle when subject to variations in applied load.

When the engine 5 is required to produce positive output torque it will tend to rock about the lower resilient mountings 6 so as to be displaced relative to the structural part of the vehicle in the direction of arrow A1 on FIG. 3 that is to say, in the primary direction.

When the engine 5 is in an overrun mode of operation (a negative output torque mode) it will tend to rock about the lower resilient mountings 6 so as to be displaced relative to the structural part of the vehicle in the direction of arrow A2 that is to say, in the secondary direction.

As shown in FIG. 2 the rotary actuator 42 is connected to a controller 50 used to control the operation of the rotary actuator 42 and hence the direction of rotation of the actuator shaft 41 and movement of the frame 21 relative to the fixed support member 11.

The controller 50 is responsive to one or more inputs shown schematically as box 60 on FIG. 2. The inputs are used to predict when the engine 5 is expected to be displaced in either direction and can be of any type or form able to provide such functionality. For example and without limitation, the inputs could comprise an output from a transmission selector sensor able to provide a signal indicative of whether the transmission is in neutral, a forward drive mode or a rear drive mode and in particular to provide an indication when neutral has been deselected and one of the two drive modes has been selected. When the transmission is in neutral the resilient mount 20 will be positioned such that the connecting arm 30 is located in a substantially mid-position in the frame 21 as shown in FIG. 1.

If it is indicated that neutral is to be deselected in the transmission then this is likely to be followed by a displacement of the engine in the primary direction A1. To counteract this displacement the actuator assembly 40 is used to move the frame 21 in the direction of arrow A2 on FIG. 1 that is to say, the rotary actuator 42 is arranged to rotate the actuator shaft 41 so as to displace the resilient mount 20 in the opposite direction to the expected movement of the engine 5.

The effect of this is to pre-load the first resilient member 23 and displace the connecting arm 30 in the direction of the arrow A2 on FIG. 1. Therefore when the engine 5 is displaced in the primary direction A1 a higher load will initially resist such movement than would be the case if the resilient mount 20 had not been displaced. The initial displacement of the connecting arm 30 will restore the connecting arm 30 it to its normal resting position and so the final displaced position of the connecting arm 30 will be closer to the initial resting position of the connecting arm 30. The displacement of the engine 5 is therefore reduced compared to a situation where the resilient mount remains static.

A similar approach can be used if, for example, it is known that a large torque demand is to be placed upon the engine 5 during normal driving which would normally lead to a displacement of the engine 5 in the primary direction A1.

In a situation where it is known that a negative torque demand is to be placed upon the engine 5 (a reverse drive situation) which would normally lead to a displacement of the engine 5 in the secondary direction A2, the actuator assembly 40 is used to move the frame 21 in the direction of arrow A1 on FIG. 1. The rotary actuator 42 is therefore arranged to rotate the actuator shaft 41 so as to displace the resilient mount 20 in the opposite direction to the expected movement of the engine 5.

The effect in this case is to pre-load the second resilient member 25 and displace the connecting arm 30 in the direction of the arrow A1 on FIG. 1. Therefore, when the engine 5 is displaced in the secondary direction A2, the displacement of the engine 5 will be reduced compared to a situation where the resilient mount 20 remains static.

It will be appreciated that various mechanisms can be used to move the resilient mount and that the disclosure is not limited to the use of a rotary electric actuator 42 as shown in FIG. 2. For example and without limitation, linear pushrods, rotary cams or rotary levers could be actuated via electrical or hydraulic actuators or a hydraulic system having pistons displaceable by hydraulic pressure constructed in a similar manner to a brake caliper could be used.

Since the mechanism used to displace the resilient mount 20 is required to tolerate the maximum load applied to the resilient mount it is preferable if the change in position of the resilient mount takes place if possible when a low load is being transmitted by the powertrain mount.

The displacement of the resilient mount from its nominal position can be arranged to be proportional to the expected load to be transmitted by the resilient mount.

A simple feed forward system can be used to adjust the position of the resilient mount based on gear selection and, in particular, in response to a change from a neutral state to a drive/reverse state of a transmission.

The disclosure is particularly advantageous where a powertrain requires "soft mounts" allowing significant movement in the idle condition. In such a case, when a drive gear is selected and a drive torque is applied the resultant load will normally overwhelm a soft mount and the supported powertrain component will be displaced in one direction a large amount.

By using this disclosure, the direction of loading is detected and the resilient mount is moved in the opposite direction so as to compensate for an expected large displacement.

Figure 4:
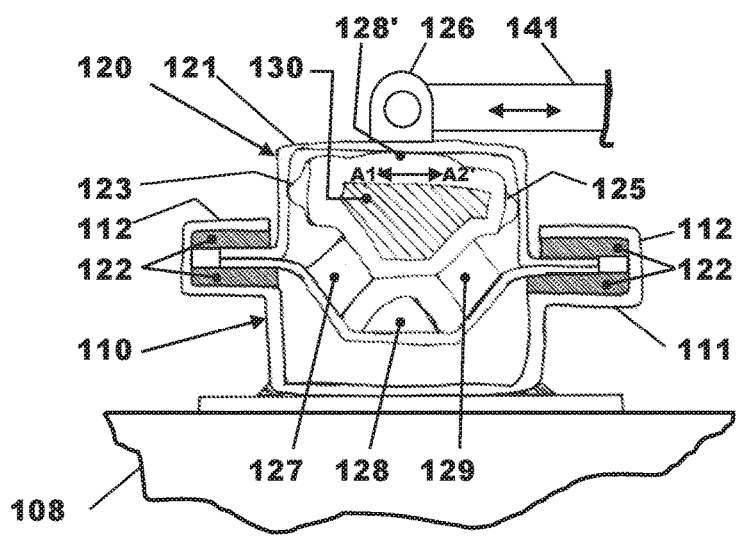
FIG. 4 is a diagrammatic side view of part of a second embodiment of a powertrain mount forming part of a powertrain mount assembly according to the first aspect of the disclosure.

With particular reference to FIG. 4 there is shown a second embodiment of a powertrain mount that is intended to be a direct replacement for the powertrain mount 10 shown in FIGS. 1 to 3.

The powertrain mount 110 comprises a fixed support member 111 arranged to be fastened to a structural part of a motor vehicle such as the structural part 108. The fixed support member 111 includes two U-shaped flanges 112 that are used to moveably connect the fixed support member 111 to a frame 121 of a resilient mount 120 via elastomeric supports 122.

The frame 121 of the resilient mount 120 can move relative to the fixed support member 111 and hence relative to the structural part 108 of the motor vehicle due to the deflectable nature of the elastomeric supports 122.

The resilient mount 120 is linearly moveable with respect to the fixed support member 111 by means of an actuator assembly comprising a linear actuator (not shown) and an actuator shaft 141. The actuator shaft 141 is attached at a free end to a lug 126 formed as part of the frame 121 of the resilient mount 120 and is attached at an opposite end to the linear actuator.

A connecting arm 130 is used to connect the resilient mount 120 to a powertrain component such as the internal combustion engine 5 shown in FIGS. 2 and 3. The connecting arm 130 is interposed between first and second resilient members 123 and 125 that are in the form of elastomeric springs.

The first and second resilient members 123 and 125 are mounted in the frame 121 and are interposed between the connecting arm 130 and opposite sides of the frame 121 so as to work in opposition to one another. The arrangement is such that movement of the connecting arm 130 in a first primary direction A1' is resisted by compression of the first resilient member 123 and movement of the connecting arm 130 in a second primary direction A2' that is opposite to the first primary direction A1' is resisted by compression of the second resilient member 125. The first and second primary directions A1' and A2' are directions that the engine 5 is expected to be displaced relative to the structural part of the motor vehicle when subject to variations in applied load.

The resilient mount 120 also includes in this case additional resilient members 127, 128, 128', 129 arranged to resist movement of the connecting arm 130 in directions other than the first and second primary directions A1' and A2'.

All of the resilient members 123, 125, 127, 128, 128' and 129 are formed as a single unitary component in the form of an elastomeric molding. The connecting arm 130 is either co-molded with the elastomeric molding or is bonded to the elastomeric molding.

When the engine 5 is required to produce positive output torque it will tend to be displaced relative to the structural part 108 of the vehicle so as to cause the connecting arm 130 to be displaced in the direction of arrow A1' that is to say, in the primary direction. When the engine 5 is in an overrun mode of operation (a negative output torque mode) the connecting arm 130 will tend to be displaced in the direction of arrow A2' that is to say, in the secondary direction.

As before a feed forward system is used to control the operation of the linear actuator so that the resilient member 120 is moved in the opposite direction to the expected displacement of the connecting arm 130.

For example, when a transmission connected to the engine 5 is in neutral, the resilient mount 120 will be positioned such that the connecting arm 130 is located in a substantially mid-position in the frame 121 as shown in FIG. 4.

If it is indicated that neutral is to be deselected in the transmission then this is likely to be followed by a displacement of the connecting arm 130 in the primary direction A1'. To counteract this displacement the linear actuator is used to move the frame 121 in the direction of the arrow A2' on FIG. 4 that is to say, in the opposite direction to the expected movement of the engine 5.

The effect of this is to pre-load the first resilient member 123 and displace the connecting arm 130 in the direction of the arrow A2' on FIG. 4. Therefore when the engine 5 is displaced in the direction A1' a higher load will initially resist such movement and the initial displacement of connecting arm 130 will only restore it to its nominal resting position. Therefore the final displacement of the connecting arm 130 from its nominal position (as shown in FIG. 4) and hence the displacement of the engine 5 will be reduced compared to a situation where the resilient mount remains static.

Similarly, if it is known that a negative torque demand is to be placed upon the engine 5 (an overrun situation) which would similarly lead to a displacement of the connecting arm 130 in the secondary direction A2', the linear actuator is used to move the frame 21 in the direction of arrow A1' on FIG. 4 that is to say, in the opposite direction to the expected movement of the connecting arm 130.

The effect of this is to pre-load the second resilient member 125 and displace the connecting arm 130 in the direction of the arrow A1' on FIG. 4. Therefore when the connecting arm 130 is displaced in the secondary direction A2' a higher initial load will resist such movement and the final displacement of the connecting arm 130 from its nominal position and hence the displacement of the engine 5 will be reduced compared to a situation where the resilient mount 120 remains static.

It will be appreciated that various mechanisms can be used to move the resilient mount and that the disclosure is not limited to the use of a linear actuator. For example and without limitation, a rotary screw, rotary cams or rotary levers could be actuated via electrical or hydraulic actuators or a hydraulic system having pistons displaceable by hydraulic pressure constructed in a similar manner to a brake caliper could be used. It will be appreciated that the displacement of the resilient mount from its nominal position could be arranged to be proportional to the expected load.

A simple feed forward system could be used to adjust the position of the resilient mount based on for example gear selection and, in particular, a change from a neutral state to a drive/reverse state.

As before, the displacement of the resilient mount from its nominal position can be arranged to be proportional to the expected load to be transmitted by the resilient mount.

Figure 5:
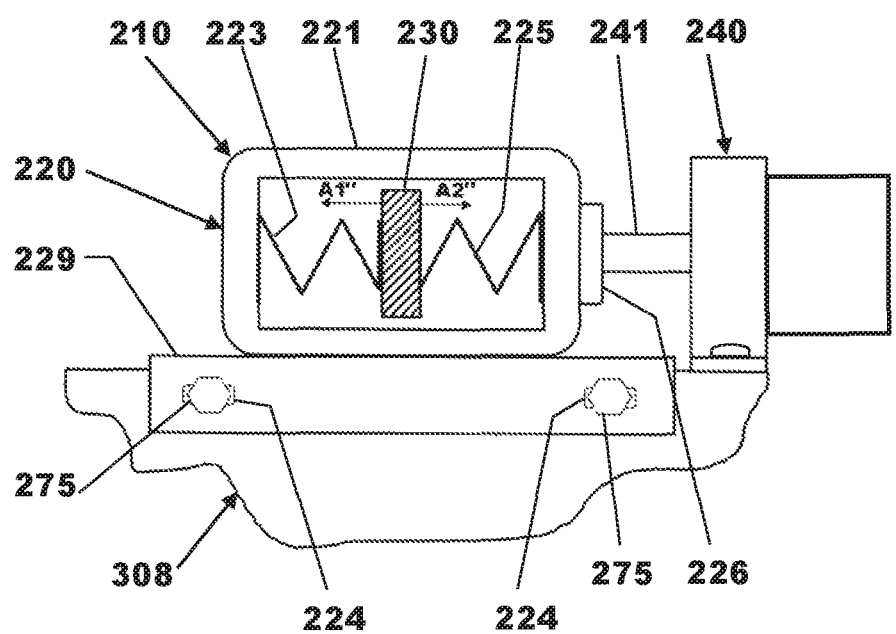
FIG. 5 is a diagrammatic side view of part of a third embodiment of a powertrain mount forming part of a powertrain mount assembly according to the first aspect of the disclosure.

With reference to FIG. 5 there is shown a third embodiment of a powertrain mount assembly which differs from the previous embodiments in that the resilient mount is moved relative to the structural part of the motor vehicle.

The powertrain mount assembly 210 comprises a resilient mount 220, a connecting arm 230 and linear actuator 240.

The resilient mount 220 has a frame 221 that is slidingly connected directly to a structural part 308 of a motor vehicle via an L-shaped flange 229 having a pair of elongate slots 224.

A pair of guide pins 275 is fastened at respective first ends to the structural part 308. Each of the guide pins 275 has a head at a free end and the L-shaped flange 229 is interposed between the heads of the guide pins 275 and the structural part 308. A spring washer (not shown) is interposed between the head of each guide pin 275 and the L-shaped flange 229 to permit relative sliding without rattling.

The linear actuator 240 is connected to the frame 221 of the resilient mount 220 via an actuator rod 241.

A connecting arm 230 is used to connect the resilient mount 220 to the powertrain component it is provided to support such as an internal combustion engine or rotary transmission. The connecting arm 230 is interposed between first and second resilient members 223 and 225 that are in the form of elastomeric springs.

The first and second resilient members 223 and 225 are mounted in the frame 221 and are interposed between the connecting arm 230 and opposite sides of the frame 221 so as to work in opposition to one another. The arrangement is such that movement of the connecting arm 230 in a first primary direction A1" is resisted by compression of the first resilient member 223 and movement of the connecting arm 230 in a second primary direction A2" that is opposite to the first primary direction A1" is resisted by compression of the second resilient member 225.

The first and second primary directions A1" and A2" are directions the powertrain component is expected to displace the connecting arm 230 relative to the structural part of the motor vehicle when subject to variations in applied load.

If it is indicated that the connecting arm 223 is likely to be displaced in the primary direction A1" the linear actuator 240 is used to move the frame 221 in the direction of arrow A2" on FIG. 5 that is to say, the linear actuator 240 is arranged to displace the resilient mount 220 in the opposite direction to the expected movement of the connecting arm 230.

The effect of this is to pre-load the first resilient member 223 and displace the connecting arm 230 in the direction of the arrow A2" on FIG. 5.

Similarly, if it is known that a negative torque demand is to be placed upon the powertrain component which would lead to a displacement of the connecting arm 230 in the secondary direction A2", the linear actuator 240 is used to move the frame 221 in the direction of arrow A1" on FIG. 5 that is to say, the linear actuator 240 is arranged to displace the resilient mount 220 in the opposite direction to the expected movement of the connecting arm 230.

The effect of this is to pre-load the second resilient member 225 and displace the connecting arm 230 in the direction of the arrow A1" on FIG. 5.

As before, the displacement of the resilient mount from its nominal position can be arranged to be proportional to the expected load to be transmitted by the resilient mount.

Therefore in summary, the disclosure provides an arrangement in which the position of a powertrain component is predictively moved relative to a fixed point on a structural member of a motor vehicle. The manner in which this is achieved is not limited to a specific mount design and can include any mechanism that connects a powertrain component (transmission/engine) to a structural part of the motor vehicle via a resilient mount.

One advantage of the disclosure is that displacement of the powertrain component is not directly related to the stiffness of the resilient mount thereby allowing a softer resilient mount to be used. Secondly, by moving the resilient mount in the opposite direction to powertrain component displacement the powertrain component will remain nearer to a nominal position and so will provide increased clearance between the powertrain component and adjacent components of the motor vehicle. Such clearance is important in avoiding material interference and restricting airflow for cooling.

Further advantages of the disclosure are:

a. The actuator used can be smaller and/or have a lower capacity than if the mount is moved when a high load is already present because the displacement of the mount is done prior to an expected displacement resulting in the application of a force to the mount when the load on the mount is low. This will result in a potential cost saving due to the use of a smaller or lower capacity actuator and also likely permit the actuator to be more easily packaged on a motor vehicle;

b. There is no need to use a complex feedback loop to control operation of the mount as is the case with an active or reactive type of mount. Therefore the cost of a mount as provided by this disclosure will be less than an active or reactive mount that requires feedback from sensors associated with the mount to measure displacement or position and an associated controller and the implementation of a mount constructed in accordance with this disclosure is as a result far simpler;

c. It is easier to apply the disclosure to existing vehicle designs than is the case with a complex active mount because all that is required is to replace the existing mount with a mount of the type described herein and provide a signal that can be used to trigger displacement of the mount.

The signal could for example readily be derived from a gear selector position sensor in the case of a manual transmission or be a signal from an existing transmission controller in the case of an automatic transmission; and d. The actuator need not be of a variable displacement type having an associated controller and in a basic configuration the actuator can be arranged to need only displace the mount a predefined distance when there is expected to be a displacement. That is to say the actuator can have a nominal off position and one or two predefined displaced positions.

A powertrain mount constructed in accordance with this disclosure is therefore simple in construction, less complex in implementation and less expensive to produce than a conventional active or reactive powertrain mount.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example with reference to one or more embodiments it is not limited to the disclosed embodiments and that alternative embodiments could be constructed without departing from the scope of the disclosure as defined by the appended claims.

The invention claimed is:

1. A powertrain mount assembly for connecting a powertrain component to a structural part of a motor vehicle, the assembly comprising a resilient mount for connection to the structural part of the motor vehicle, a connecting arm for connecting the resilient mount to the powertrain component, an actuator to displace the resilient mount relative to the structural part of the motor vehicle, and a controller to control the actuator to displace the resilient mount in response to an input indicative of an expected movement of the powertrain component, wherein the resilient mount comprises a frame, first and second resilient members mounted in the frame and interposed between the connecting arm and the frame such that movement of the connecting arm in a first primary direction is resisted by compression of the first resilient member and movement of the connecting arm in a second primary direction that is opposite to the first primary direction is resisted by compression of the second resilient member and, when the input indicates that the powertrain component is expected to be displaced relative to the structural part of the motor vehicle, the controller is arranged to use the actuator to displace the frame of the resilient mount in an opposite direction to the expected movement of the powertrain component so as to produce a pre-load in a respective one of the first and second resilient members of the resilient mount.

2. The assembly as claimed in claim 1, wherein a fixed support member is provided for fastening to the structural part of the motor vehicle, the frame of the resilient mount is moveably connected to the fixed support member and, when the powertrain component is expected to be displaced relative to the structural part of the motor vehicle, the actuator is arranged to displace the frame of the resilient mount relative to the fixed support member in the opposite direction to the expected movement of the powertrain component.

3. The assembly as claimed in claim 1, wherein the frame of the resilient mount is arranged for sliding attachment directly to the structural part of the motor vehicle and, when the powertrain component is expected to be displaced relative to the structural part of the motor vehicle, the actuator is arranged to displace the frame of the resilient mount relative to the structural part of the motor vehicle in the opposite direction to the expected movement of the powertrain component.

4. The assembly as claimed in claim 1, wherein the powertrain component is one of an engine and a transmission.

5. The assembly as claimed in claim 1, wherein the resilient mount further comprises one or more additional resilient members arranged to resist movement of the connecting arm in one or more directions other than the first and second primary directions.

6. The assembly as claimed in claim 5, wherein the resilient members are formed as a single unitary component.

7. The assembly as claimed in claim 5, wherein the first and second primary directions are directions the powertrain component is expected to be displaced relative to the structural part of the motor vehicle when subject to variations in applied load.

8. The assembly as claimed in claim 1, wherein the resilient members are formed as a single unitary component.

9. The assembly as claimed in claim 1, wherein the first and second primary directions are directions the powertrain component is expected to be displaced relative to the structural part of the motor vehicle when subject to variations in applied load.

10. A motor vehicle having a body structure, an engine driving a transmission, and a powertrain mount, the powertrain mount comprising a resilient mount for connection to the body structure of the motor vehicle, a connecting arm for connecting the resilient mount to one of the engine and the transmission, an actuator to displace the resilient mount relative to the body structure, and a controller to control the actuator to displace the resilient mount in response to an input indicative of an expected movement of one of the engine and the transmission, wherein the resilient mount comprises a frame, first and second resilient members mounted in the frame and interposed between the connecting arm and the frame such that movement of the connecting arm in a first primary direction is resisted by compression of the first resilient member and movement of the connecting arm in a second primary direction that is opposite to the first primary direction is resisted by compression of the second resilient member and, when the input indicates that one of the engine and the transmission is expected to be displaced relative to the body structure, the controller is arranged to use the actuator to displace the frame of the resilient mount in an opposite direction to the expected movement of one of the engine and the transmission so as to produce a pre-load in a respective one of the first and second resilient members of the resilient mount, wherein the powertrain mount is configured to connect one of the engine and the transmission to a structural member forming part of the body structure of the motor vehicle and the controller controls the actuator to displace the resilient mount in response to the input indicative of the expected movement of one of the engine and the transmission.

11. The vehicle as claimed in claim 10, wherein the input is a signal indicative that a state of the transmission is changing from a neutral state to a drive state.

12. The vehicle as claimed in claim 11, wherein the drive state of the transmission is a forward drive state.

13. The vehicle as claimed in claim 11, wherein the drive state of the transmission is a rear drive state.

14. The vehicle as claimed in claim 10, wherein the input is a signal indicative that a torque demand for the engine is to be rapidly increased.

15. The vehicle as claimed in claim 10, wherein the input is a signal indicative that a torque demand for the engine is to be rapidly reduced.

16. A powertrain mount assembly of a vehicle, comprising:
   a resilient mount, an actuator, and a controller to control the actuator in response to an input indicative of an expected powertrain component movement, and displace a frame of the mount in an opposite direction to the input indicating that a powertrain component is expected to be displaced so as to produce a pre-load in one of a first and a second resilient member of the resilient mount; and
   a connecting arm for connecting the resilient mount to the powertrain component;
   wherein the first and second resilient members are interposed between the connecting arm and the frame such that movement of the connecting arm in a first direction is resisted by compression of the first resilient member and movement of the connecting arm in a second direction that is opposite to the first direction is resisted by compression of the second resilient member.

17. The assembly of claim 16, wherein the actuator is configured to displace the resilient mount relative to a structural part of the vehicle.

18. The assembly of claim 16, wherein the controller is arranged to use the actuator to displace the frame of the resilient mount.

* * * * *